April 27, 1965 U. KÖRBER 3,180,940

ROUTING CONNECTIONS IN A COMMUNICATION SYSTEM

Filed Aug. 7, 1961 2 Sheets-Sheet 1

United States Patent Office 3,180,940
Patented Apr. 27, 1965

3,180,940

ROUTING CONNECTIONS IN A COMMUNICATION SYSTEM

Ulrich Körber, Munich, Germany, assignor to Siemens & Halske Aktiengesellschaft Berlin and Munich, a corporation of Germany Filed Aug. 7, 1961, Ser. No. 129,883
Claims priority, application Germany, Aug. 26, 1960, S 70,085, Patent 1,107,726
17 Claims. (Cl. 179—18)

Figure 1:
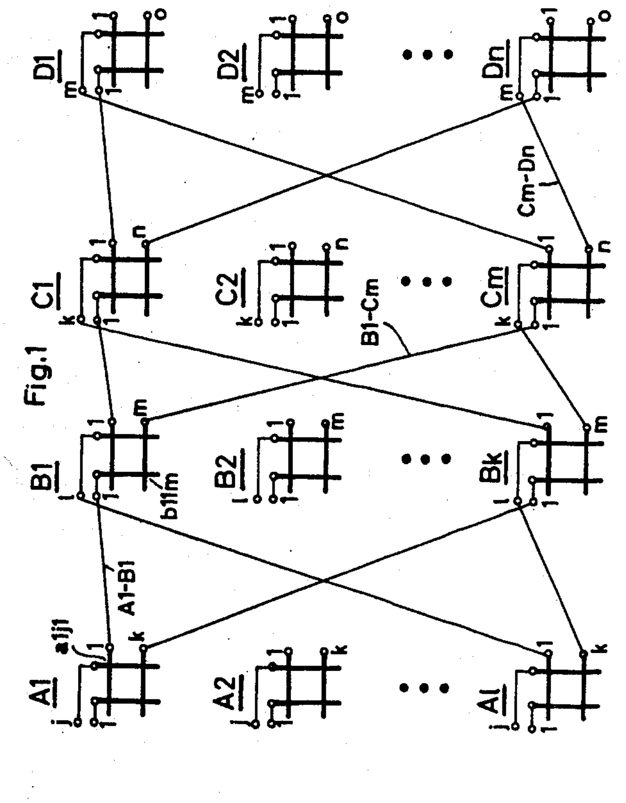

This invention relates to the routing of connections in a communication system and is particularly concerned with a method of and apparatus for hunting and selecting idle connection paths in a field of coupling points comprising a desired plurality of coupling stages.

Systems are already known, as disclosed, for example, in copending applications Serial Nos. 760,238, now Patent No. 3,038,968, and 762,656, filed respectively September 10, 1958, and September 22, 1958, owned by the assignee named in the present case, in which idle connection routes or paths, available in a field of coupling points having a desired plurality of stages, can be ascertained, and wherein one such idle path, if there are several, can be selected for use in the extension of a connection. The coupling or connecting points are, in the individual stages of such a coupling field, arranged in crossing fashion, and the system is therefore also referred to as crosspoint system. Coupling points or crosspoints which are multipled according to rows and columns, form a coupling multiple which is realized by a coordinate switch.

The coordinate switches forming the coupling multiples may be well known crossbar or relay switches; so called cross-coil switches may likewise be used, being variants of crossbar switches employing sealed-in electromagnetically controlled contact springs which are actuated by energizing coils and held in actuated position by holding coils arranged in crossing fashion with respect to the energizing coils. Examples of cross-coil switches may be found in Patent No. 2,983,792, dated May 9, 1961, and in copending application Serial No. 573,039, filed March 21, 1956, which is likewise owned by the assignee named herein.

At each coupling or connecting point is provided a coupling element which is placed in operatively actuated position whenever a connection path is to be extended thereover. The coupling element may, for example, involve a plurality of contacts.

The individual coupling stages, which may respectively comprise a plurality of coupling multiples (coordinate switches), are in particular manner interconnected over trunk lines comprising respectively a plurality of conductors, for example, line or voice current conductors and control conductors, the latter being also referred to as seizure or private conductors. The arrangement of these trunk lines is determined by the grouping plan or scheme, based upon traffic requirements, that is, upon considerations having to do with the origination, distribution and destination of calls. The trunk lines are preferably arranged so that at least one trunk line extends from a coupling multiple of one coupling stage to each coupling multiple of the neighboring coupling stage.

Simultaneously occurring calls are processed successively by the use of a centrally disposed known marker device which is connected with the coupling or crosspoint field over information lines.

In the previously noted known systems, there is superposed upon the coupling field a so-called path hunting or route hunting network, comprising conductors which are allotted to the trunk lines and which are directly interconnected at the places of the coupling field at which are disposed the coupling multiples. The points of interconnection are referred to as marker or marking points. On such a route hunting network have to be placed various marking criteria without causing any mutual interference. There are, therefore, provided two separate route hunting conductors for each trunk line, to which are, in the course of the route or path hunting operation, independently connected different criteria in the form of predetermined potentials. These potentials are, at bisecting or intersecting points extending transversely through the route hunting network parallel to the coupling stages, evaluated for the selection of individual ways or route portions. The selected route portions determine the connection route or path.

The present invention proposes an arrangement comprising a path or route hunting network which has instead of two, only one conductor per trunk line, thereby simplifying the construction and reducing the required expenditure. This results in a particular advantage in the event that changes have to be made in the grouping scheme of the coupling field, such as may be necessitated, for example, by enlargement of the capacity of an exchange, which requires placing on given outputs of the coupling field an increased traffic load. This will be apparent upon considering that a regrouping of the coupling field necessitates corresponding changes in the route hunting network. The reduced number of conductors of such network reduces the expenditure in time and labor required for making the changes.

The invention is accordingly concerned with a system for hunting and selecting idle connection paths or routes in a coupling or crosspoint field having a desired plurality of coupling or crosspoint stages, wherein the hunting for idle trunk lines, which are suitable for extending connections, is effected by means of a route hunting network having conductors which are allotted to the trunk lines and interconnected over marking points which are allotted to the coupling multiples, and wherein there are provided intersecting or bisecting points extending transversely through the route hunting network in parallel to the coupling stages, the number of which is sufficient to assure definite determination of the connection paths to be extended. The characteristic features of the system require placing on at least one input to be used for a connection to be extended, a marking potential which is transmitted to outputs of the coupling field over routing conductors of the routing network allotted to idle trunk lines, checking such transmission of the marking potential at least at one output that may be used for the desired connection, successively operatively affecting or influencing the transmission of the marking potential at the various intersecting points at the bisected route or path portions, so as to ascertain in the checking of the transmission at the output side whether the respective operatively affected route or path portion lies in the path of the transmission and is accordingly to be considered as a part of the connection path, and selecting at each intersecting or bisecting point one of the route portions which is thus found suitable as a part of the connection path and maintaining such portion in condition for transmission.

A marking criterion or potential is in the present system transmitted only once over the route finding network, and the second route hunting conductors used in the previously mentioned systems are therefore unnecessary and can be omitted.

Figure 2:
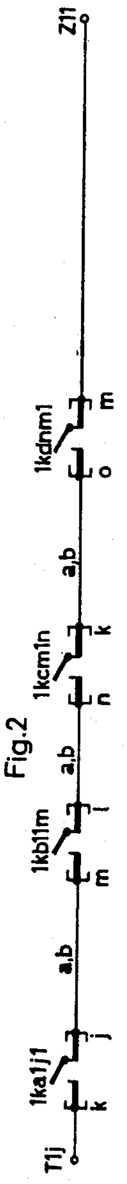
Figure 3:
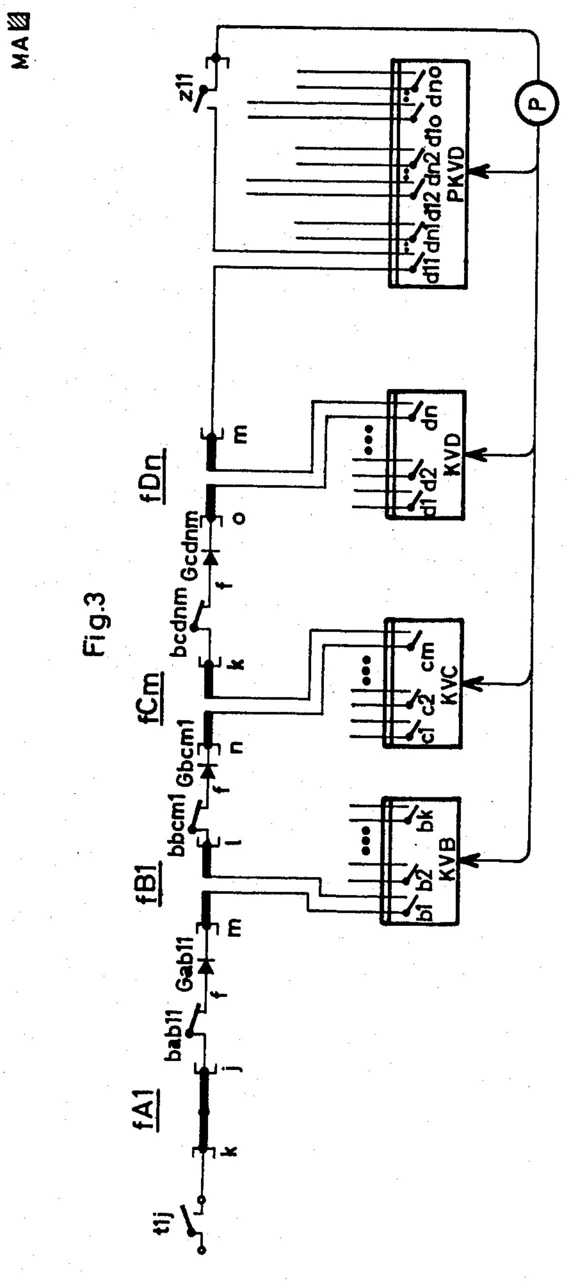
Figure 4:
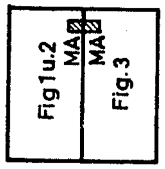

Details of the invention will now be described with reference to the accompanying drawings, in which:

FIG. 1 shows an example of a simple grouping scheme or plan for a four-stage coupling or crosspoint field;

FIG. 2 indicates the course of line conductors for a connection extending between an input and an output of the coupling field of FIG. 1;

FIG. 3 represents an example of a circuit arrangement for the system according to the invention; and FIG. 4 shows how the FIGS. 1 to 3 should be placed, namely, FIG. 3 below FIGS. 1 and 2, with the index marks MA in alignment, so as to associate the parts of FIG. 3 properly in vertical alignment with the parts shown in FIGS. 1 and 2.

The arrangement of the coupling or crosspoint field shown in FIG. 1 and the course of the line or voice current conductors shown in FIG. 2 will be described first so as to facilitate the understanding of the invention.

FIG. 1 shows a four-stage coupling field comprising coupling stages A to D, each stage having a plurality of coupling multiples, each of which is realized by a coordinate switch which may be of the previously noted type. Thus, the coupling stage A contains the coupling multiples (coordinate switches) A1 to A*l*, the coupling stage B containing the coupling mutliples (coordinate switches) B1 to B*k*, etc., etc. The coupling multiples or coordinate switches are in each stage of identical structure.

The inputs are at the coupling stage A (coupling multiples=coordinate switches A1 to A*l*). Each coupling multiple of the stage A has *j*-inputs and *k*-outputs. Each coupling multiple of this stage is over a trunk line connected with each coupling multiple of the stage B. The coupling stage B therefore has *k*-coupling multiples each with *l*-inputs. Each input of the coupling field can be connected with each coupling multiple of the coupling stage B. The arrangement continues in identical manner over the further coupling stages. The outputs of the coupling multiples D1 to D*n* of the coupling stage D also constitute the outputs of the coupling field as such.

The coupling multiples (coordinate switches) are merely schematically represented and the trunk lines extending therebetween are only partially indicated, each by a single line. Each trunk line has, of course, a plurality of conductors including line conductors *a* and *b* which are arranged, for connection through the coupling field, as indicated in FIG. 2, both line conductors comprising identical elements and being for this reason conveniently shown as a single conductor marked *a, b*.

At the crossing points of the rows (horizontal) and the columns (vertical) of the coupling multiples formed by the coordinate switches, that is, at the coupling points, are arranged contacts which are cooperatively associated with the respective coupling points and therefore referred to as coupling point contacts. Thus, there is in the coupling multiple (coordinate switch) A1 a coupling point *a*1*j*1 at the crossing point of the *j*-column and the first row, at which are arranged coupling point contacts including contacts 1*ka*1*j*1 which appear in the line conductors *a, b*, indicated in FIG. 2. Contacts are in similar manner arranged at the coupling point *b*11*m* of the coordinate switch forming the coupling multiple B1, including contacts 1*kb*11*m* which appear in the line conductors *a, b*, indicated in FIG. 2. Coupling point contacts of this kind are not only included in the network of line conductors but also in networks of other not illustrated conductors. The grouping plan shown in FIG. 1 represents the scheme according to which the coupling multiples and marking points allotted thereto are in the various networks interconnected over trunk lines. The line conductors *a* and *b* of trunk lines extend as shown in FIG. 2, over coupling point contacts arranged at the coupling points in the respective coupling multiples.

As noted before, FIG. 2 shows the course of the line conductors *a* and *b*, extending between an input and an output of the coupling field, assuming thereby one definite connection path or route of many possible routes, which is produced in accordance with the path or route hunting operation by the setting, that is, by the closure of the various coupling point contacts which are shown in FIG. 2 in normal or open position.

This connection path may for example extend from the coupling field input T1*j* to the coupling field output Z11. The coupling field input T1*j* lies at the *j*-input of the coupling multiple A1 of the coupling stage A, and the coupling field output Z11 lies at the first output of the coupling multiple D*n* of the coupling stage D. The connection path extends in this example from the coupling field input T1*j* over the coupling point contact 1*ka*1*j*1 to the output 1 of the coupling multiple A1. The coupling point contact is accordingly disposed at the crossing point between the *j*-column and the row 1 of the coupling multiple A1.

The multiple symbols *k* and *j*, shown respectively at the left and right of the coupling point contact 1*ka*1*j*1 in FIG. 2, indicate that a plurality of coupling point contacts are connected at the respective columns and rows of the coupling field. The multiple symbol *k* refers to the *k*-coupling point contacts connected at a column, and the multiple symbol *j* refers to the *j*-coupling point contacts connected to a row. From the coupling point contact 1*ka*1*j*1 extends a trunk line to the input 1 of the coupling multiple B1 of the coupling stage B. At the corresponding crossing point *b*11*m* is disposed the coupling point contact 1*kb*11*m* included in the connection path shown in FIG. 2. Multiple symbols indicated by *m* and *l* are again shown respectively at the left and right of contact 1*kb*11*m*. From the output *m* of the coupling multiple B1 extends a trunk line to the first input 1 of the coupling multiple C*m* of the coupling stage C. The connection path extends then over the coupling point contact 1*kcm*1*n* by way of a trunk line to and over the coupling point contact 1*kdnm*1 to the output Z11.

FIG. 3 shows an example of a circuit arrangement operating in accordance with the routing system proposed by the present invention. The illustrated circuit arrangement comprises routing conductors which are designated as *f*-conductors. Only a portion of the routing network is shown in FIG. 3 in similar manner as the network of line conductors *a* and *b* is represented in FIG. 2. The network of routing conductors is superposed on the coupling field and is constructed according to the grouping plan represented in FIG. 1. The routing network has however, a few peculiarities which will be brought out as the description progresses.

First of all, the routing or hunting network has in the places of the coupling multiples (coordinate switches) provided in the coupling stages (FIG. 1) so-called marking junctures represented respectively by a connection point at which the routing conductors, which are allotted to the trunk lines terminating at the corresponding coupling multiples, are mutually interconnected. In connection with the *f*-conductors shown in FIG. 3, there are provided the marking junctures *f*A1, *f*B1, *f*C*m* and *f*D*n*. There are moreover seizure contacts inserted in the *f*-conductors. These seizure contacts are closed in the case of routing conductors belonging to idle trunk lines while they are open in the case of routing conductors belonging to seized or occupied trunk lines. In the *f*-conductor belonging to the trunk line having the line conductors *a* and *b*, which extends from the coupling point contact 1*ka*1*j*1 to the coupling point contact 1*kb*11*m* (FIG. 2), is included the seizure contact *bab*11 shown in FIG. 3. Further seizure contacts *bbcm*1 and *bcdnm* are similarly included in the *f*-conductors. The *f*-conductors contain in addition decoupling rectifier G*ab*11, G*bcm*1 and G*cdnm*, which are poled so that marking potentials are transmitted from the inputs to the outputs of the coupling field but not vice versa.

The *f*-conductors shown in FIG. 3 are only part of the total network of *f*-conductors. There are in the network as many marking junctures as there are coupling multiples in the coupling field according to FIG. 1, between which extend the trunk lines.

The marking potential at the marking juncture *f*A1 is extended over the routing conductors, which are connected thereto and belong to idle trunk lines, to a plurality of making junctures in the coupling stage B. The decoupling rectifiers in the routing conductors thereby prevent impermissible extension of the marking potential from the marking juncture of the coupling stage B, rearwardly to other inputs of the coupling field, which would result in undesirable bypassing of occupied routing conductors which are interrupted by open seizure contacts.

Contacts such as *t1j* (FIG. 3) serve for placing the marking potential on inputs of the coupling field, the illustrated contact *t1j* being cooperatively associated with the input *j* of the coupling multiple A1 (FIG. 1), that is, with the input T1*j* of FIG. 2. Further contacts may be provided to which are connected several inputs of the same coupling multiple. Character P (FIG. 3) indicates a testing device for checking the transmission of the marking potential over the coupling field. Such testing device can be connected to outputs of the coupling field over contacts, one of which is indicated at *z*11, such contact being associated with the first output of the coupling multiple D*n* (FIG. 1.), thus forming a part of the output Z11 (FIG. 2). The testing device P is operatively actuated or energized when the marking potential which had been placed on the coupling field at the input side thereof, appears at an output of the coupling field to which the testing device is cooperatively connected over a contact such as *z*11.

The testing device P is connected with counting chain circuits which are allotted to the intersecting or bisecting points and controls the course of the switching operations in such counting chain circuits depending upon the transmission of the marking potential over the coupling field. The bisecting points provided in the coupling field can be disposed so that they bisect trunk lines or marking junctures. If they bisect trunk lines, the latter are determined as route portions, and if they bisect marking junctures, coupling multiples will be determined as route portions. The counting chain circuits KVB and KVC are at bisecting points which bisect marking junctures and therefore serve for the selection of coupling multiples. The circuit shown in FIG. 3 also comprises further counting chain circuits KVD and PKVD, the presence of which shall be neglected for the time being; the contacts included in these further counting chain circuits shall therefore be assumed to be closed.

The counting chain circuit KVB comprises a plurality of make contacts *b*1, *b*2 . . ., *bk*, each such contact being inserted in a marking juncture of the coupling stage B (FIG. 1). The make contact *b*1 is inserted in the marking juncture *f*B1; the make contact *b*2 is inserted in the marking juncture *f*B2, etc. These make contacts are by the counting chain circuits in the course of a routing operation in predetermined manner respectively closed and opened, which is effected under control of the testing device P. The counting chain circuit KVC is constructed exactly like the counting chain circuit KVB; its make contacts *c*1, *c*2, . . ., *cm* are respectively inserted in the marking junctures *f*C1 . . . *f*C*m* of the coupling stage C.

An example for the course of a routing operation shall now be described, wherein the testing device P and the counting chain circuits KVB and KVC are operatively actuated.

It shall be assumed that a connection path is to be found which leads from the input *j* of the coupling mpltiple A1 to the output 1 of the coupling multiple D*n*. The contact *t1j* is first actuated to place on the respective input of the coupling field a positive potential as a marking criterion. Contact *z*11 is also actuated to connect the testing device P to the output of the coupling field which is involved in the connection to be extended. The contacts *b*1 . . . *bk* and *c*1 . . . *cm* of the counting chain circuits KVB and KVC are likewise operatively actuated. If there is at least one idle connection path between the input and the output involved, the positive marking potential will be transmitted over the routing network to the testing device P. Appearance of this positive marking potential therefore indicates that there is available at least one suitable connection path. The testing device P is now operatively actuated, thereby initiating the routing or hunting operation as such.

The transmission of the marking criterion is now to be successively operatively affected at the various bisecting points of the bisected route portions, so as to ascertain incident to the checking of the transmission, at the output side, whether the respective operatively affected route portion lies in the transmission path. The bisecting points can thereby be considered in desired sequence, and the route portions at a given bisecting point can be operatively affected in desired sequence.

The bisecting point with the counting chain circuit KVB may be considered first in connection with this routing example. In order to affect the transmission, the make contacts *b*1 . . . *bk* are opened again and the positive marking potential will accordingly disappear at the testing device P. The make contacts *b*1 . . . *bk* of the counting chain circuit KVB are thereupon successively closed in desired sequence. As soon as a make contact is closed which is included in a suitable route portion extending between the marked input and the involved output of the coupling field, the positive marking potential will reappear at the testing device P. The latter will again be operatively actuated and will stop the counting chain circuit KVB in the last attained position thereof. The last operatively affected route portion remains in the condition for transmission in which it had been put by the last closed make contact of the counting chain circuit KVB. The selection of a route portion at this bisecting point is thereby concluded.

There must now be effected the selection of a route portion at the bisecting point with the counting chain circuit KVC. The make contacts of this counting chain circuit are, as before, in the counting chain circuit KVB, first opened, causing disappearance of the positive marking potential at the testing circuit P, and thereupon successively closed again until the positive marking potential reappears at the testing device P. The selected route portion is determined by the contact *c*1 . . . *cm* which had been closed last.

In the above described example, the transmission of the marking potential is in the course of operatively affecting such transmission at the route portion of a bisecting point, interrupted at all involved route portions, and is thereupon successively restored again. However, the operation may also be such that the transmission of the marking potential is interrupted at the successive route portions and is not restored until the previously present transmission of the marking, over the coupling field, is interrupted. The contacts, for example, the make contacts *b*1 . . . *bk* of the counting chain circuit KVB are thereby opened and are not to be closed again until the transmission of the marking potential, over the coupling field, is interrupted.

In the described route hunting example, the counting chain circuit KVB is stopped upon closure of the make contact *b*1 and the counting chain circuit KVC is similarly stopped upon closure of the make contact *cm*, thereby effecting selection of the route or connection path shown in FIG. 3, which extends over the marking junctures *f*A1, *f*B1, *f*C*m* and *f*D*n* and the coupling multiples A1, B1, C*m* and D*n*, respectively. The selection operations taking place incident to the route hunting effected direct selection of the marking junctures *f*B1 and *f*C*m*, correlated with the coupling multiples B1 and C*m*, respectively. In the present grouping of the coupling field, there is only one route from the marking juncture *f*B1 to the contact *t1j*, namely, over the marking juncture *f*A1. There is similarly only one route from the marking juncture *f*C*m* to the contact *z*11, namely, over the marking juncture *f*D*n*. There is likewise only one trunk line between the coupling multiples allotted to the marking junctures *f*B1 and *f*C*m*. Accordingly, the selection of the marking junctures *f*B1 and *f*C*m* determines the entire connection path or route. The route hunting is thus concluded with the selection of these marking junctures. The extension of the selected route by the operative actuation of the respective coupling point contacts in the involved coupling multiples will be presently explained.

Attention may be directed to the fact that, in the case of a coupling field having more than four coupling stages, correspondingly more bisecting points must be provided for the determination of connection paths or routes. The counting chain circuits allotted to the respective bisecting points can be operatively actuated in the desired sequence. The selection of a route portion at a bisecting point is accordingly independent of whether or not a selection had been effected at one of the other bisecting points. The system according to the present invention is therefore applicable in the case of coupling fields having as many coupling stages as desired.

A case shall now be explained which requires in the route finding, consideration not of one, but of a plurality of outputs of the coupling field, which are present in one and the same coupling multiple. In the coupling field represented in FIG. 1, such outputs would be in a coupling multiple of the coupling stage D. All of the outputs which might possibly be used must then be connected for the route hunting to the testing device over suitable contacts. There must first be determined a connection path from the involved input of the coupling field to the coupling multiple having the outputs to be considered, and one of these outputs or outlets must thereupon be selected. This latter selection is effected by the use of the counting chain circuit PKVD, such counting chain circuit being cooperatively associated with a bisecting point which bisects the lines extending to the respective output of the coupling field.

The counting chain circuit PKVD has a plurality of sets of make contacts. The first set includes the make contacts *d*11 . . . *dn*1, such contacts being respectively disposed in the lines which extend respectively to the first outlet of one of the coupling multiples D1 . . . D*n*1. The second set includes the make contacts *d*12 . . . *dn*2, which are disposed in lines extending respectively to the second output of one of the coupling multiples D1 . . . D*n*. The other sets of contacts include correspondingly distributed make contacts.

In order to determine now one of several possible outputs, all make contacts are, for example, opened and thereupon successively closed again according to the respective sets, until reappearance, at the testing device P, of the positive marking potential which had been disconnected responsive to the opening of the contacts. The last closed set of contacts comprises make contacts which are disposed in lines extending respectively to outputs at predetermined points of the coupling field. This determines the point at which is disposed the output to be utilized in the coupling multiple over which the connection is to be extended. For example, when all outputs of the coupling multiple D*n* are connected to the testing device P, and when the positive marking potential reappears upon closure of the make contacts *d*11 . . . *dn*1, the output Z11 will have been selected.

In the event that the outputs which might be used do not belong to the same coupling multiple, but are distributed over several coupling multiples of the coupling stage D, it will be necessary to determine over which one of these coupling multiples the connection path is to be routed. There is for this purpose provided the counting chain circuit KVD which is cooperatively associated with the bisecting points which bisect the coupling multiples of the coupling stage D. Selection of a route portion, that is, a coupling multiple, at this bisecting point, and seizure thereof, again determines unequivocally a connection path to a single output of the coupling field. It may be mentioned here, that the sequence in which the route portions to be used are selected at the various bisecting points, is entirely immaterial.

In case a plurality of inputs distributed at random over the coupling multiples of the coupling stage A could be used for a desired connection path, marking potential is to be placed on all of such inputs over the contacts assigned thereto. In order to select for the connection path one of these inputs, a bisecting point is to be provided extending respectively through the coupling multiple or through the marking junctures of the coupling stage A and through the lines incoming at the respective inputs. Two counting chain circuits are then to be provided for the respective bisecting points, such counting chains corresponding in structure and function to the counting chain circuits KVD and PKVD. The provision of such counting chains in this manner will make it possible to select from the several inputs a given one and also the route leading thereto, in the same manner as has been described in connection with the selection of outputs of the coupling field. It is likewise possible, assuming that all necessary counting chain circuits are provided therefor, to select a route extending over the coupling field, in a situation in which there are several inputs as well as several outputs available for such route.

In the case of the grouping plan according to FIG. 1, the number of inputs of a coupling stage is equal to the number of outputs of the preceding coupling stage. Accordingly, only one trunk line is connected to the respective terminals of the coupling multiples of these coupling stages. Grouping plans for coupling fields may also be used which do not require these limitations for the construction thereof; however, the hunting and selecting of connection routes, according to the invention, can nevertheless be applied to such coupling fields. A case shall therefore be considered additionally, in which more than one trunk line extend between selected coupling multiples of neighboring coupling stages. The trunk line to be utilized for a route is in such case not determined by the selection of coupling multiples but requires selection by means of a further counting chain circuit. However, such further counting chain circuit is not required in the event that the selection operations apply to trunk lines instead of to coupling multiples.

The foregoing explanations concerning the hunting and selection of a connection route assumed the presence and functions of a marker device, the details of which have been omitted since they are well known and understood. The purpose of the marker to be used is to process initiated calls successively by temporarily placing marking potential at predetermined points of the routing network, thereby preparing for the hunting and route selecting operations described.

The selected connection route or path is connected through by the operative actuation of the coupling point contacts forming part thereof. As noted before, the coupling multiples may be realized by coordinate switches of diverse construction, such as crossbar switches, crosscoil switches or relay switches. The particular manner in which a selected route is switched through, by the actuation of the coupling point contacts or crosspoint contacts, will depend upon the particular coordinate switches which are being employed and, further, also upon whether the route is determined by selected trunk lines or by selected coupling multiples. The above mentioned application Serial No. 762,656 describes in detail several examples of switching connection paths through over coordinate switches after the selection of route portions thereof. Switching or circuit means are thereby provided for the setting of given connection paths, serving for the actuation of coupling point contacts included in a network of setting conductors which are superposed on the coupling field. The coupling point contacts are held in actuated positions in part by switching circuit means which are connected to a network of seizure or private conductors.

Changes may be made within the scope and spirit of the appended claims which define what is believed to be new and desired to have protected by Letters Patent.

I claim:

1. A circuit arrangement for hunting and selecting idle connection paths, comprising a coupling field having inputs and outputs and forming part of a communication system, said field having a plurality of coupling stages, a route hunting network including conductors for hunting idle trunk lines which are suitable for the extension of connections, each trunk having a conductor alloted thereto, marking junctures respectively assigned to coupling multiples over which said conductors are mutually interconnected, a plurality of bisecting points extending transverse of the route hunting network parallel to the coupling stages, at which are determined route portions to be utilized, for the definite determination of connection paths to be established, means for placing on at least one input of the coupling field which might be utilized for a desired connection, a marking potential which is transmitted to outputs of the coupling field over the routing conductors of said route hunting network, which are assigned to idle trunk lines, means for checking said transmission at least at one output of the coupling field which might be utilized for the desired connection, means for operatively affecting the transmission of said marking potential successively at said bisecting points, with respect to the corresponding bisected route portions, to obtain checking information as to whether the respective operatively affected route portion is included in the transmission path and thus adapted for the connection path which is to be established, and means for selecting at each bisecting point a route portion which is adapted for the connection path and maintaining such selected route portion in condition for transmission of said marking potential.

2. A circuit arrangement according to claim 1, comprising means for first interrupting the transmission of said marking potential at all route portions, thereby also interrupting said transmission over the coupling field, and thereupon restoring the transmission successively at said route portions until the marking potential is again transmitted over the coupling field.

3. A circuit arrangement according ot claim 2, wherein the route portion at a bisecting point, at which the transmission of the marking potential had been affected last, forms a selected route portion for the connection path to be established.

4. A circuit arrangement according to claim 1, comprising means for successively interrupting the transmission of the marking potential at successive route portions and maintaining such interruption until the transmission of said marking potential over the coupling field is also interrupted.

5. A circuit arrangement according to claim 4, wherein the route portion at a bisecting point, at which the transmission of the marking potential had been affected last, forms a selected route portion for the connection path to be established.

6. A circuit arrangement according to claim 1, wherein said bisecting points are disposed so that the selection effected at such points is concerned with trunk lines.

7. A circuit arrangement according to claim 6, wherein a plurality of inputs and outputs of the coupling field are to be considered in the route hunting to be effected, and wherein further bisecting points are provided for the lines extending respectively to said outputs and inputs, comprising means for simultaneously marking all the involved inputs, and combining the involved outputs for the checking of the transmission of the marking potential.

8. A circuit arrangement according to claim 1, wherein said bisecting points are disposed so that the selection effected at such points is concerned with coupling multiples.

9. A circuit arrangement according to claim 8, wherein a plurality of inputs and outputs of the coupling field are to be considered in the route hunting to be effected, and wherein further bisecting points are provided for the lines extending respectively to said outputs and inputs, comprising means for simultaneously marking all the involved inputs, and combining the involved outputs for the checking of the transmission of the marking potential.

10. A circuit arrangement according to claim 1, wherein a testing device forms the means for checking the transmission of the marking potential over the coupling field said device comprising, means forming counting chain circuits cooperatively assigned to the respective bisecting points, said counting chain circuits comprising contact means for respectively opening routing portions at the corresponding bisecting points to interrupt the transmission of the marking potential and for closing such portions so as to effect such transmission thereover.

11. A circuit arrangement according to claim 10, wherein the switching operations to be performed by said counting chain circuits are by said testing circuit respectively initiated and stopped again depending upon reappearance or non-reappearance of the transmission of said marking potential over the coupling field, until a connection path is determined by the setting of the counting chain circuits at the corresponding bisecting points.

12. A circuit arrangement according to claim 11, wherein the respective routing conductors are operatively associated with trunk lines, comprising, disposed in the respective routing conductors, seizure contact means which are closed when the corresponding trunk line is idle while being open when the respective trunk line is busy.

13. A circuit arrangement according to claim 11, comprising a network of setting conductors superposed upon the coupling field, said setting conductors containing switching means for actuating coupling points contacts for switching through connection paths determined by the route hunting operations.

14. A circuit arrangement according to claim 11, comprising, disposed in the respective routing conductors, rectifier means poled so as to permit transmission of marking potential only from the inputs to the outputs of the coupling field.

15. A circuit arrangement according to claim 14, comprising a network of setting conductors superposed upon the coupling field, said setting conductors containing switching means for actuating coupling point contacts for switching through connection paths determined by the route hunting operations.

16. A circuit arrangement according to claim 14, wherein the respective routing conductors are operatively associated with trunk lines, comprising, disposed in the respective routing conductors, seizure contact means which are closed when the corresponding trunk line is idle while being open when the respective trunk line is busy.

17. A circuit arrangement according to claim 15, comprising a network of seizure conductors containing switching means for holding actuated coupling point contacts in actuated position thereof.

References Cited by the Examiner

UNITED STATES PATENTS

| | | | |
|---|---|---|---|
| 2,741,663 | 4/56 | Oberman | 179—18 |
| 2,970,190 | 1/61 | Zahlhaas et al. | 179—22 |
| 3,041,409 | 6/62 | Zarouni | 179—22 |

ROBERT H. ROSE, *Primary Examiner.*

WILLIAM C. COOPER, *Examiner.*